(12) United States Patent
Chen

(10) Patent No.: US 12,374,882 B2
(45) Date of Patent: Jul. 29, 2025

(54) INTEGRATED CIRCUITS WITH CDM ESD PROTECTION CAPABILITIES

(71) Applicant: NANYA TECHNOLOGY CORPORATION, New Taipei (TW)

(72) Inventor: Chien Yu Chen, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 139 days.

(21) Appl. No.: 18/522,284

(22) Filed: Nov. 29, 2023

(65) Prior Publication Data

US 2025/0174986 A1    May 29, 2025

(51) Int. Cl.
*H02H 9/04* (2006.01)
(52) U.S. Cl.
CPC .................................. *H02H 9/046* (2013.01)
(58) Field of Classification Search
CPC ...................................................... H02H 9/046
USPC ........................................................... 361/56
See application file for complete search history.

(56) References Cited

U.S. PATENT DOCUMENTS

| | | | | |
|---|---|---|---|---|
| 5,287,241 A * | 2/1994 | Puar | ...................... | H10D 89/60 361/111 |
| 6,144,542 A * | 11/2000 | Ker | ...................... | H10D 89/921 361/111 |
| 6,437,407 B1 * | 8/2002 | Ker | ...................... | H10D 89/601 361/111 |
| 6,867,461 B1 * | 3/2005 | Ker | ...................... | H10D 89/601 257/361 |
| 7,638,847 B1 * | 12/2009 | O | ......................... | H10D 89/711 257/361 |
| 9,425,188 B2 * | 8/2016 | Ali | ....................... | H10D 89/819 |
| 10,714,933 B2 | 7/2020 | Pok et al. | | |
| 11,689,014 B2 * | 6/2023 | Krishnamoorthy | ...... | H02H 9/02 361/111 |
| 2002/0021538 A1 * | 2/2002 | Chen | .................... | H10D 89/611 361/56 |
| 2002/0064007 A1 * | 5/2002 | Chang | ................. | H10D 89/611 361/56 |
| 2003/0128486 A1 * | 7/2003 | Chuang | ............... | H10D 89/815 361/56 |

(Continued)

FOREIGN PATENT DOCUMENTS

| CN | 202084537 | 12/2011 | | |
|---|---|---|---|---|
| CN | 114374405 A * | 4/2022 | ............... | H02H 9/04 |

(Continued)

OTHER PUBLICATIONS

"Office Action of Taiwan Counterpart Application", issued on Dec. 26, 2024, p. 1-p. 7.

*Primary Examiner* — Dharti H Patel
(74) *Attorney, Agent, or Firm* — JCIPRNET

(57) ABSTRACT

An integrated circuit includes a power rail, a connecting pad, a first internal circuit, a second internal circuit, and an electrostatic discharge (ESD) protection circuit. The first internal circuit is coupled to the connecting pad through a first signal wire. The second internal circuit is coupled to the first internal circuit through a second signal wire. The ESD protection circuit is coupled between the second signal wire and the power rail. When charged-device model (CDM) ESD occurs in the integrated circuit, the ESD protection circuit conducts ESD charge on the second signal wire to the power rail.

10 Claims, 5 Drawing Sheets

(56) References Cited

U.S. PATENT DOCUMENTS

| | | | | |
|---|---|---|---|---|
| 2004/0141269 A1* | 7/2004 | Kitagawa | ............. | H10D 89/601 |
| | | | | 361/56 |
| 2005/0270712 A1* | 12/2005 | Huang | ................. | H10D 89/921 |
| | | | | 361/90 |
| 2005/0286186 A1* | 12/2005 | Chang | ................. | H10D 89/921 |
| | | | | 361/56 |
| 2011/0266624 A1* | 11/2011 | Duvvury | ............. | H10D 89/713 |
| | | | | 438/237 |
| 2013/0114170 A1* | 5/2013 | Chen | ..................... | H02H 9/046 |
| | | | | 361/56 |
| 2014/0376135 A1* | 12/2014 | Huo | ..................... | H10D 89/711 |
| | | | | 361/56 |
| 2018/0287378 A1* | 10/2018 | Sithanandam | ....... | H10D 89/811 |
| 2021/0351176 A1* | 11/2021 | Xu | ....................... | H10D 89/811 |
| 2023/0198252 A1* | 6/2023 | Mizan | ..................... | H10D 89/60 |
| | | | | 361/56 |

FOREIGN PATENT DOCUMENTS

| | | | | |
|---|---|---|---|---|
| JP | 2006093598 | 4/2006 | | |
| JP | 2021044488 | 3/2021 | | |
| TW | 200802781 | 1/2008 | | |
| TW | 201308573 | 2/2013 | | |
| TW | 201411803 | 3/2014 | | |
| TW | 202025434 | 7/2020 | | |
| WO | WO-2007035777 A2 * | 3/2007 | ........... | H10D 84/038 |
| WO | WO-2021109149 A1 * | 6/2021 | ............. | H02H 9/046 |

\* cited by examiner

INTEGRATED CIRCUITS WITH CDM ESD PROTECTION CAPABILITIES

BACKGROUND

Technical Field

The disclosure relates to an electronic circuit, and particularly relates to an integrated circuit with charged-device model (CDM) electrostatic discharge (ESD) protection capabilities.

Description of Related Art

Electrostatic discharge (ESD) is an energy release caused by the electrostatic. Electronic devices can suffer permanent damage when subjected to high voltages from the ESD. There are three types of ESD models, respectively human body model (HBM), machine model (MM), and charged-device model (CDM). For the HBM and MM, the source of the ESD is outside the integrated circuit (IC). ESD charge enters the IC from outside the IC through the pins and connecting pads of the IC. In order to prevent the ESD charge of the HBM and MM from damaging the core circuit of the IC, a general ESD protection circuit is disposed adjacent to the input or output bonding pad of the IC to discharge the ESD current nearby. Most of the existing ESD protection circuits are used for the protection of the ESD events from the HBM and MM. However, in addition to the HBM and MM, there is also an ESD phenomenon of the CDM. The scenario simulated by the CDM is that electrostatic charge is first stored in an internal circuit and/or a substrate of the electrically floating IC. The internal circuit of the IC is also referred to as the core circuit or a function circuit. When a certain pin of the IC is suddenly grounded, the electrostatic charge in the IC is discharged through the pin. That is, the source of the ESD current of the CDM is not electrostatic outside the IC, but rather the electrostatic charge accumulated in the internal circuit and/or the substrate of the IC. This CDM type of ESD often causes the gates of input stage circuits in the internal circuit of the IC to be destroyed. Although the general ESD protection circuit has been disposed adjacent to the input or output bonding pad of the IC (that is, the general ESD protection circuit is disposed outside the internal circuit), the general ESD protection circuit may not have time to discharge CDM ESD charge inside the internal circuit, so that an ESD CDM voltage causes damage to electronic components of the internal circuit. How to further prevent the CDM ESD voltage from damaging the electronic components is one of many technical issues in the field of electronic circuits.

SUMMARY

The disclosure provides an integrated circuit with charged-device model (CDM) electrostatic discharge (ESD) protection capabilities.

In an embodiment of the disclosure, the integrated circuit includes a first power rail, a connecting pad, a first internal circuit, a second internal circuit, and a first ESD protection circuit. The first internal circuit is coupled to the connecting pad through a first signal wire. The second internal circuit is coupled to the first internal circuit through a second signal wire. The first ESD protection circuit is coupled between the second signal wire and the first power rail. When CDM ESD occurs in the integrated circuit, the first ESD protection circuit conducts ESD charge on the second signal wire to the first power rail.

Based on the above, the first ESD protection circuit according to the embodiments of the disclosure is disposed in the internal circuit of the integrated circuit. The first end of the first ESD protection circuit is coupled to a critical path (such as the second signal wire) of the internal circuit. The second end of the first ESD protection circuit is coupled to the first power rail. When CDM ESD occurs, the first ESD protection circuit can instantly conduct ESD charge on the critical path to the first power rail. Therefore, the first ESD protection circuit can effectively clamp an ESD voltage on the critical path to prevent the ESD voltage from damaging the electronic components of the internal circuit. That is, the integrated circuit has CDM ESD protection capabilities.

In order to make the above-mentioned features and advantages of the disclosure more comprehensible, the embodiments are described in detail below with the accompanying drawings.

DESCRIPTION OF THE EMBODIMENTS

Figure 1:
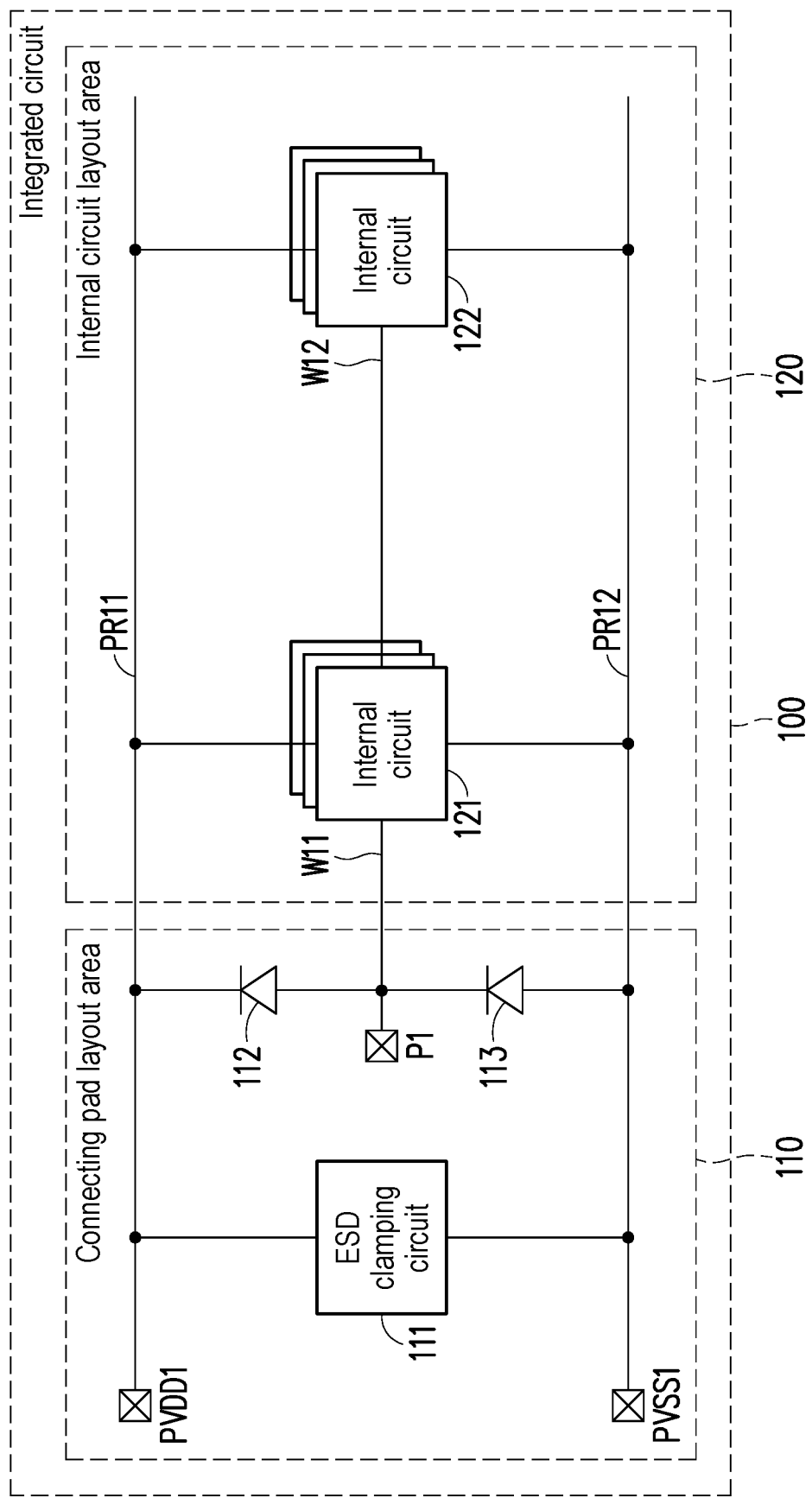
FIG. 1 is a schematic circuit block diagram of an integrated circuit.

The word "coupling (or connecting)" used throughout the specification (including the appended claims) of the disclosure may refer to any direct or indirect connection means. For example, if the text describes that the first device is coupled (or connected) to the second device, it should be interpreted to mean that the first device may be directly connected to the second device, or that the first device may be connected indirectly to the second device through other devices or some connection means. The terms "first" and "second" mentioned throughout the specification (including the appended claims) of the disclosure are used to name elements or to distinguish different embodiments or ranges, and are not used to limit the upper limit or lower limit of the number of the elements or to limit the order of the elements. In addition, wherever possible, elements/components/steps with the same reference numerals are used in the drawings and embodiments to represent the same or similar parts. For the elements/components/steps with the same reference numerals or the same terms in different embodiments, reference may be made to each other for relevant descriptions.

FIG. 1 is a schematic circuit block diagram of an integrated circuit. Generally speaking, an integrated circuit 100 includes a connecting pad layout area 110 and an internal circuit layout area 120. The connecting pad of the integrated circuit 100 is arranged in the connecting pad layout area 110, and the internal circuit (the function circuit, or the core circuit) is arranged in the internal circuit layout area 120. Based on the actual design, the connecting pad in the connecting pad layout area 110 may be a bonding pad or other types of pads. In the embodiment shown in FIG. 1, a connecting pad P1, a connecting pad PVDD1, and a connecting pad PVSS1 serve as examples of the connecting pads in the connecting pad layout area 110, while an internal circuit 121 and an internal circuit 122 serve as examples of internal circuits in the internal circuit layout area 120.

The connecting pad P1 may be a signal input pad or a signal output pad. Based on the actual design, the connecting pad P1 may be a bidirectional transmission signal pad. The internal circuit 121 is coupled to the connecting pad P1 through a signal wire W11. The internal circuit 122 is coupled to the internal circuit 121 through a signal wire W12. The connecting pad PVDD1 is coupled to a power rail PR11. The power rail PR11 may transmit a power voltage of the connecting pad PVDD1 to the internal circuit (for example, the internal circuit 121 and 122) of the integrated circuit 100. The connecting pad PVSS1 is coupled to a power rail PR12. The power rail PR12 may transmit a reference voltage (such as a ground voltage or other fixed voltages) of the connecting pad PVSS1 to the internal circuit (for example, the internal circuit 121 and 122) of the integrated circuit 100.

An electrostatic discharge (ESD) protection circuit is arranged in the connecting pad layout area 110 and is disposed adjacent to the connecting pad of the integrated circuit 100 to discharge an ESD current of the connecting pad nearby. In the embodiment shown in FIG. 1, the ESD protection circuit includes an ESD clamping circuit 111, a diode 112, and a diode 113. The ESD clamping circuit 111 is coupled between the power rail PR11 and the power rail PR12. This embodiment does not limit the specific implementation of the ESD clamping circuit 111. For example, the ESD clamping circuit 111 may include a well-known ESD clamping circuit or other ESD clamping circuits. The cathode of the diode 112 is coupled to the power rail PR11. The anode of the diode 112 and the cathode of the diode 113 are coupled to the connecting pad P1. The anode of the diode 113 is coupled to the power rail PR12.

When an ESD event occurs in the connecting pad P1, the ESD protection circuit (the ESD clamping circuit 111, the diode 112, and the diode 113) arranged in the connecting pad layout area 110 can conduct ESD charge on the connecting pad P1 to at least one of the power rail PR11 and the power rail PR12. For example, when a positive ESD pulse occurs at the connecting pad P1 and the connecting pad PVDD1 is grounded, the diode 112 can conduct the ESD current from the connecting pad P1 to the power rail PR11 in a timely manner. When a positive ESD pulse occurs at the connecting pad P1 and the connecting pad PVSS1 is grounded, the diode 112 can conduct the ESD current from the connecting pad P1 to the power rail PR11 in a timely manner, and the ESD clamping circuit 111 can conduct the ESD current from the power rail PR11 to the power rail PR12 in a timely manner. When a negative ESD pulse occurs at the connecting pad P1 and the connecting pad PVSS1 is grounded, the diode 113 can conduct the ESD current from the power rail PR12 to the connecting pad P1 in a timely manner. When a negative ESD pulse occurs at the connecting pad P1 and the connecting pad PVDD1 is grounded, the ESD clamping circuit 111 can conduct the ESD current from the power rail PR11 to the power rail PR12 in a timely manner, and the diode 113 can conduct the ESD current from the power rail PR12 to the connecting pad P1 in a timely manner. Therefore, the ESD clamping circuit 111, the diode 112, and the diode 113 can prevent the ESD voltage or current from damaging the core circuits 121 and 122 positioned in the internal circuit layout area 120. It should be noted that, the specific implementation of the ESD protection circuit positioned in the connecting pad layout area 110 should not be limited to the circuit diagram shown in FIG. 2. Based on the actual design, the connecting pad layout area 110 may have other ESD circuits.

The ESD protection circuit positioned in the connecting pad layout area 110, for example, the ESD clamping circuit 111, the diode 112, and the diode 113, can effectively prevent ESD events of the human body model (HBM) and/or machine model (MM) from damaging the core circuit positioned in the internal circuit layout area 120. However, in addition to the HBM and MM, there is also an ESD phenomenon of the charged-device model (CDM). The source of the ESD current of the CDM is not electrostatic outside the integrated circuit 100, but rather the electrostatic charge accumulated in the internal circuit and/or the substrate of the integrated circuit 100. For example, when the integrated circuit 100 is electrically floating, the core circuit 121 and/or 122 may accumulate a large amount of electrostatic charge based on various factors.

Although the ESD protection circuit has been disposed adjacent to the connecting pad (that is, the ESD protection circuit is disposed outside the internal circuit layout area 120), the ESD protection circuit may not have time to discharge CDM ESD charge located inside the internal circuit layout area 120. For example, assuming that the signal wire W12 is a critical path, and assuming that the core circuit 122 accumulates a large amount of electrostatic charge. When the connecting pad P1 is suddenly grounded, the electrostatic charge (the CDM ESD charge) accumulated in the core circuit 122 is discharged to the connecting pad P1 through the signal wire W12, the internal circuit 121, and the signal wire W11. Excessive ESD voltage on the signal wire W12 may damage electronic components of the internal circuit 122 and/or electronic components of the internal circuit 121. In the following description, how to further prevent the CDM ESD voltage on the signal wire W12 (the critical path) from damaging the electronic components will be illustrated using different embodiments.

Figure 2:
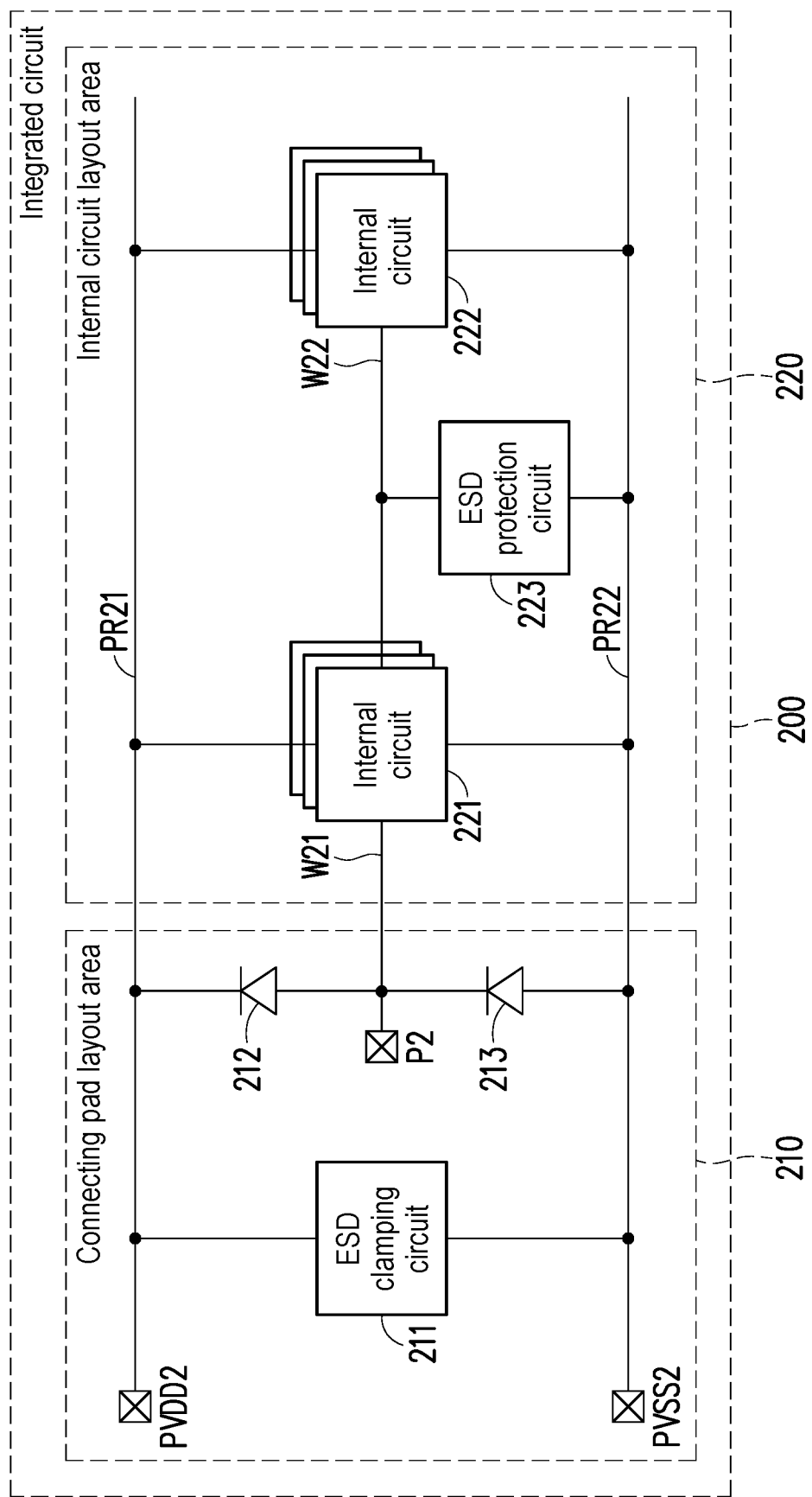
FIG. 2 is a schematic circuit block diagram of an integrated circuit according to an embodiment of the disclosure.

FIG. 2 is a schematic circuit block diagram of an integrated circuit according to an embodiment of the disclosure. An integrated circuit 200 shown in FIG. 2 includes a connecting pad layout area 210 and an internal circuit layout area 220. For the integrated circuit 200, the connecting pad layout area 210, and the internal circuit layout area 220 shown in FIG. 2, reference may be made to relevant descriptions of the integrated circuit 100, the connecting pad layout area 110, and the internal circuit layout area 120 shown in FIG. 1 and analogies may be made. A connecting pad P2, a connecting pad PVDD2, a connecting pad PVSS2, and an ESD protection circuit (an ESD clamping circuit 211, a diode 212, and a diode 213) are arranged in a connecting pad layout area 210, and a signal wire W22, an internal circuit 221, and an internal circuit 222 are arranged in the internal circuit layout area 220. For the connecting pad P2, the connecting pad PVDD2, the connecting pad PVSS2, the ESD clamping circuit 211, the diode 212, the diode 213, a power rail PR21, a power rail PR22, a signal wire W21, the signal wire W22, the internal circuit 221, and the internal circuit 222 shown in FIG. 2, reference may be made to relevant descriptions of the connecting pad P1, the connecting pad PVDD1, the connecting pad PVSS1, the ESD clamping circuit 111, the diode 112, the diode 113, the power rail PR11, the power rail PR12, the signal wire W11, the signal wire W12, the internal circuit 121, and the internal circuit 122 shown in FIG. 1 and analogies may be made, so details will not be repeated here.

In the embodiment shown in FIG. 2, the integrated circuit 200 also includes an ESD protection circuit 223. The ESD protection circuit 223 is arranged in the internal circuit layout area 220, and the ESD protection circuit 223 is coupled to the critical path in the internal circuit layout area 220. The signal wire W22 shown in FIG. 2 is assumed to be the critical path in the internal circuit layout area 220. The actual critical path in the internal circuit layout area 220 may be determined according to the actual design. The ESD protection circuit 223 is coupled between the signal wire W22 and the power rail PR22. The power rail PR22 is configured to transmit the reference voltage (such as the ground voltage or other fixed voltages). When CDM ESD (charged-device model electrostatic discharge) occurs in the integrated circuit 200, the ESD protection circuit 223 can instantly conduct ESD charge on the signal wire W22 to the power rail PR22. When the integrated circuit 200 is operating normally, the ESD protection circuit 223 hardly affects the operation of the signal wire W22.

Figure 3:
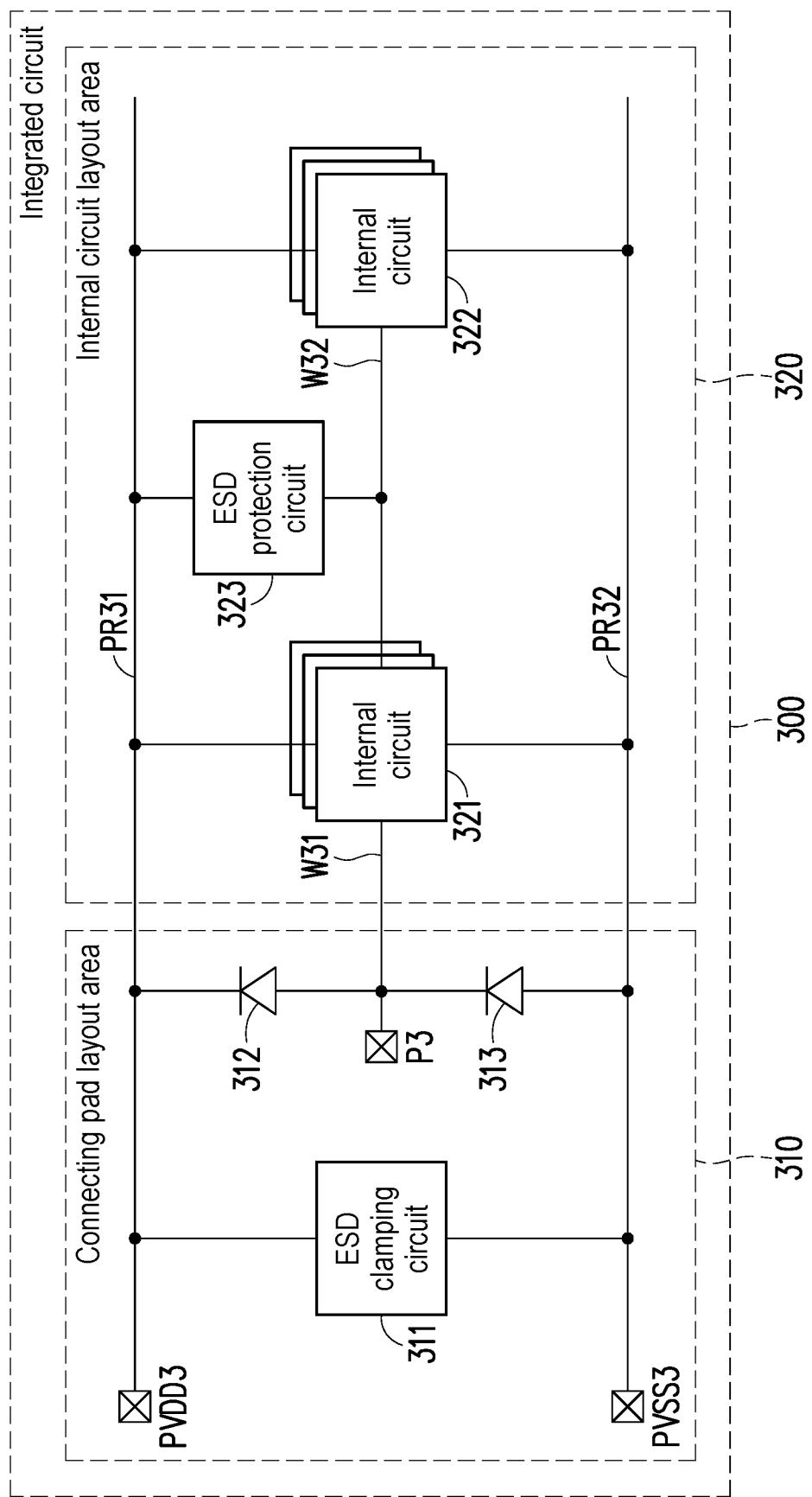
FIG. 3 is a schematic circuit block diagram of an integrated circuit according to another embodiment of the disclosure.

FIG. 3 is a schematic circuit block diagram of an integrated circuit according to another embodiment of the disclosure. An integrated circuit 300 shown in FIG. 3 includes a connecting pad layout area 310 and an internal circuit layout area 320. A connecting pad P3, a connecting pad PVDD3, a connecting pad PVSS3, and an ESD protection circuit (an ESD clamping circuit 311, a diode 312, and a diode 313) are arranged in the connecting pad layout area 310, and a signal wire W32, an internal circuit 321, and an internal circuit 322 are arranged in the internal circuit layout area 320. For the integrated circuit 300, the connecting pad layout area 310, the internal circuit layout area 320, the connecting pad P3, the connecting pad PVDD3, the connecting pad PVSS3, the ESD clamping circuit 311, the diode 312, the diode 313, a power rail PR31, a power rail PR32, a signal wire W31, the signal wire W32, the internal circuit 321, and the internal circuit 322 shown in FIG. 3, reference may be made to relevant descriptions of the integrated circuit 100, the connecting pad layout area 110, the internal circuit layout area 120, the connecting pad P1, the connecting pad PVDD1, the connecting pad PVSS1, the ESD clamping circuit 111, the diode 112, the diode 113, the power rail PR11, the power rail PR12, the signal wire W11, the signal wire W12, the internal circuit 121, and the internal circuit 122 shown in FIG. 1 and analogies may be made, so details will not be repeated here.

In the embodiment shown in FIG. 3, the integrated circuit 300 also includes an ESD protection circuit 323. The ESD protection circuit 323 is arranged in the internal circuit layout area 320, and the ESD protection circuit 323 is coupled to the critical path in the internal circuit layout area 320. The signal wire W32 shown in FIG. 3 is assumed to be the critical path in the internal circuit layout area 320. The actual critical path in the internal circuit layout area 320 may be determined according to the actual design. The ESD protection circuit 323 is coupled between the signal wire W32 and the power rail PR31. The power rail PR31 is used to transmit the power voltage. When the CDM ESD (charged-device model electrostatic discharge) occurs in the integrated circuit 300, the ESD protection circuit 323 can instantly conduct the ESD charge on the signal wire W32 to the power rail PR31. When the integrated circuit 300 is operating normally, the ESD protection circuit 323 hardly affects the operation of the signal wire W32.

Figure 4:
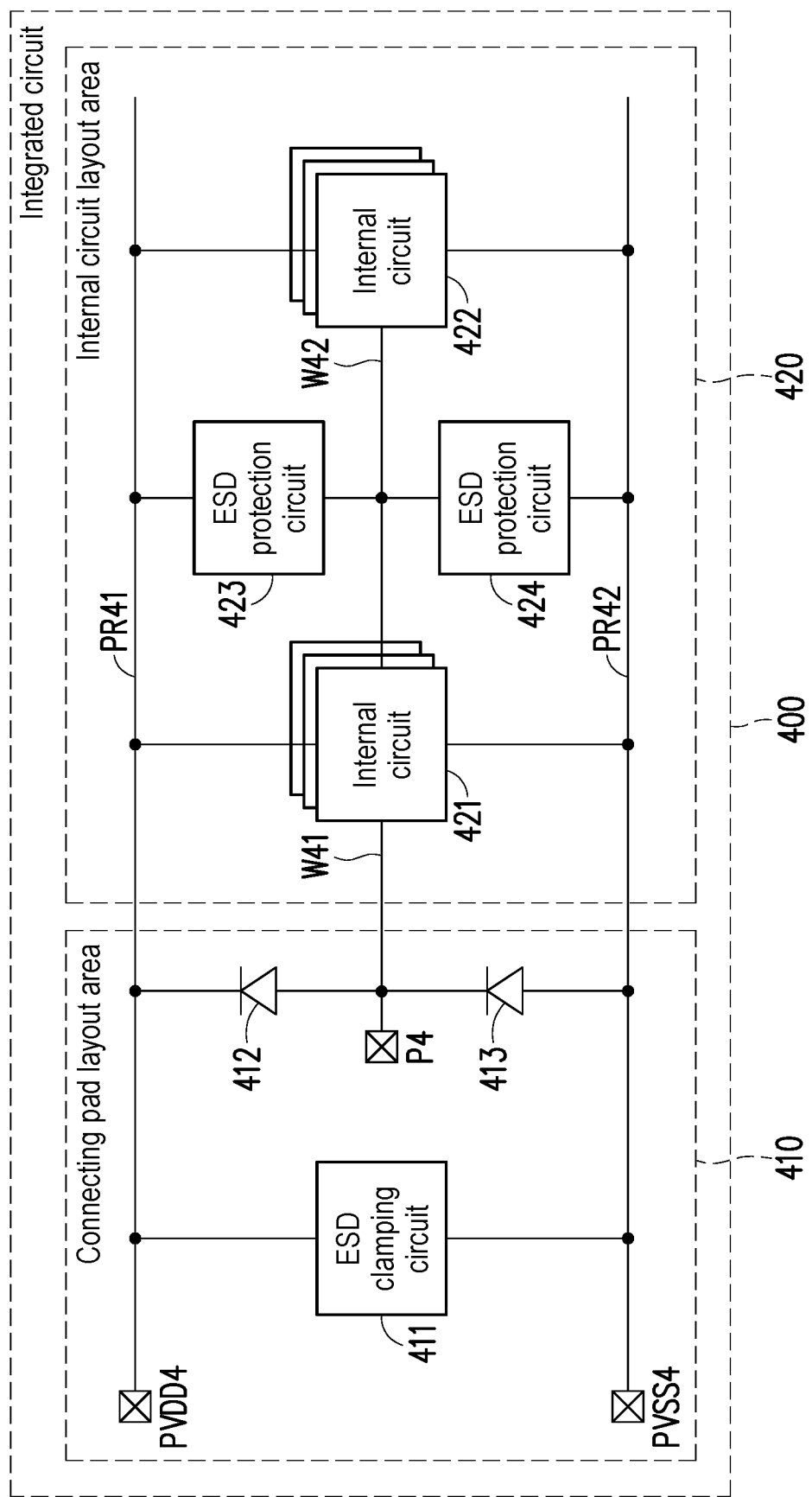
FIG. 4 is a schematic circuit block diagram of an integrated circuit according to still another embodiment of the disclosure.

FIG. 4 is a schematic circuit block diagram of an integrated circuit according to still another embodiment of the disclosure. An integrated circuit 400 shown in FIG. 4 includes a connecting pad layout area 410 and an internal circuit layout area 420. A connecting pad P4, a connecting pad PVDD4, a connecting pad PVSS4, and an ESD protection circuit (an ESD clamping circuit 411, a diode 412, and a diode 413) are arranged in the connecting pad layout area 410, and an ESD protection circuit 423, an ESD protection circuit 424, a signal wire W42, an internal circuit 421, and an internal circuit 422 are arranged in the internal circuit layout area 420. For the integrated circuit 400, the connecting pad layout area 410, the internal circuit layout area 420, the connecting pad P4, the connecting pad PVDD4, the connecting pad PVSS4, the ESD clamping circuit 411, the diode 412, the diode 413, a power rail PR41, a power rail PR42, a signal wire W41, the signal wire W42, the internal circuit 421, and the internal circuit 422 shown in FIG. 4, reference may be made to relevant descriptions of the integrated circuit 100, the connecting pad layout area 110, the internal circuit layout area 120, the connecting pad P1, the connecting pad PVDD1, the connecting pad PVSS1, the ESD clamping circuit 111, the diode 112, the diode 113, the power rail PR11, the power rail PR12, the signal wire W11, the signal wire W12, the internal circuit 121, and the internal circuit 122 shown in FIG. 1 and analogies may be made, for the ESD protection circuit 423 shown in FIG. 4, reference may be made to relevant descriptions of the ESD protection circuit 323 shown in FIG. 3 and analogies may be made, and for the ESD protection circuit 424 shown in FIG. 4, reference may be made to relevant descriptions of the ESD protection circuit 223 shown in FIG. 2 and analogies may be made, so details will not be repeated here.

Figure 5:
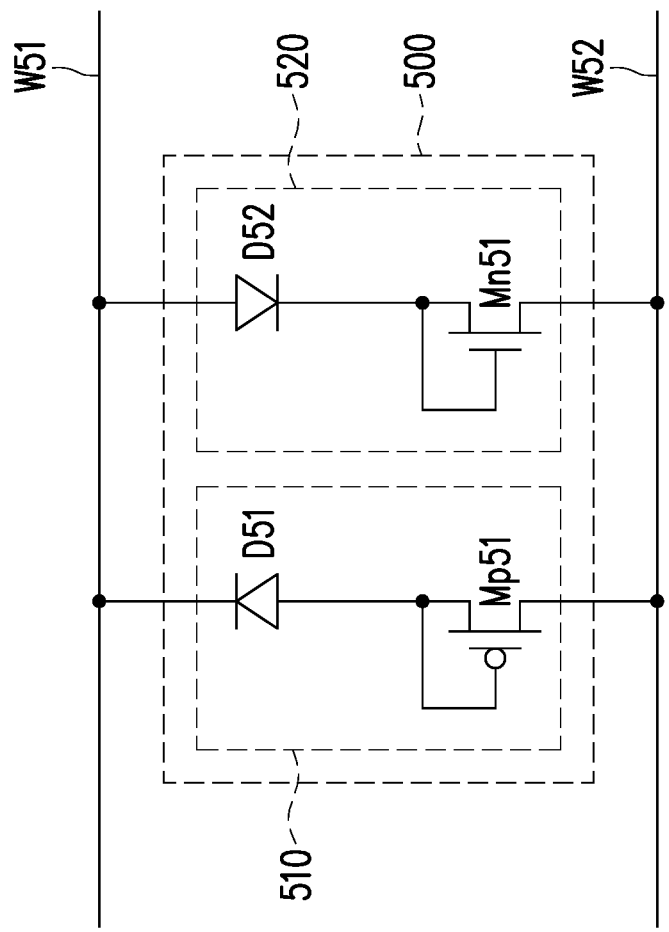
FIG. 5 is a schematic circuit block diagram of an ESD protection circuit arranged in an internal circuit layout area according to an embodiment of the disclosure.

FIG. 5 is a schematic circuit block diagram of an ESD protection circuit arranged in an internal circuit layout area according to an embodiment of the disclosure. An ESD protection circuit 500 shown in FIG. 5 is coupled between a wire W51 and a wire W52. The ESD protection circuit 500 shown in FIG. 5 may be used as one of many embodiments of the ESD protection circuit 223 shown in FIG. 2. Therefore, for the ESD protection circuit 500, the wire W51, and the wire W52 shown in FIG. 5, reference may be made to relevant descriptions of the ESD protection circuit 223, the signal wire W22, and the power rail PR22 shown in FIG. 2. Alternatively, the ESD protection circuit 500 shown in FIG. 5 may be used as one of many embodiments of the ESD protection circuit 323 shown in FIG. 3. Therefore, for the ESD protection circuit 500, the wire W51, and the wire W52 shown in FIG. 5, reference may be made to relevant descriptions of the ESD protection circuit 323, the power rail PR31, and the signal wire W32 shown in FIG. 3. Alternatively, the ESD protection circuit 500 shown in FIG. 5 may be used as one of many embodiments of the ESD protection circuit 423 shown in FIG. 4. Therefore, for the ESD protection circuit 500, the wire W51, and the wire W52 shown in FIG. 5, reference may be made to relevant descriptions of the ESD protection circuit 423, the power rail PR41, and the signal wire W42 shown in FIG. 4. Alternatively, for the ESD protection circuit 500 shown in FIG. 5, reference may be made to relevant descriptions of the ESD protection circuit 424 shown in FIG. 4. Therefore, for the ESD protection circuit 500, the wire W51, and the wire W52 shown in FIG. 5, reference may be made to relevant descriptions of the ESD protection circuit 424, the signal wire W42, and the power rail PR42 shown in FIG. 4.

In the embodiment shown in FIG. 5, the ESD protection circuit 500 includes a diode circuit 510 and a diode circuit 520. The cathode of the diode circuit 510 and the anode of the diode circuit 520 are coupled to the wire W51 (one of the signal wire and the power rail), and the anode of the diode circuit 510 and the cathode of the diode circuit 520 are coupled to the wire W52 (the other one of the signal wire and the power rail). When the wire W51 has positive electrostatic charge of the CDM, the diode circuit 520 can conduct the positive electrostatic charge on the wire W51 to the wire W52. When the wire W51 has negative electrostatic charge of the CDM, the diode circuit 510 can conduct the negative electrostatic charge on the wire W51 to the wire W52. When the wire W52 has positive electrostatic charge of the CDM, the diode circuit 510 can conduct the positive electrostatic charge on the wire W52 to the wire W51. When the wire W52 has negative electrostatic charge of the CDM, the diode circuit 520 can conduct the negative electrostatic charge on the wire W52 to the wire W51.

This embodiment does not limit the specific implementation of the diode circuit 510 and the diode circuit 520. For example, the diode circuit 510 may include a diode D51 and a transistor Mp51, and the diode circuit 520 may include a diode D52 and a transistor Mn51. The cathode of the diode D51 is coupled to the cathode of the diode circuit 510. The first end (e.g., the drain) and the control end (e.g., the gate) of the transistor Mp51 are coupled to the anode of the diode D51. The second end (e.g., the source) of the transistor Mp51 is coupled to the anode of the diode circuit 510. The anode of the diode D52 is coupled to the anode of the diode circuit 520. The first end (e.g., the drain) and the control end (e.g., the gate) of the transistor Mn51 are coupled to the cathode of the diode D52. The second end (e.g., the source) of the transistor Mn51 is coupled to the cathode of the diode circuit 520.

In summary, the ESD protection circuit 500 is arranged in the internal circuit of the integrated circuit. The first end of the ESD protection circuit 500 is coupled to the critical path of the internal circuit (for example, one of the wire W51 and the wire W52). The second end of the ESD protection circuit 500 is coupled to the power rail (for example, the other one of the wire W51 and the wire W52). The internal circuit may gradually accumulate electrostatic charge and form a pressure difference. When the electrostatic charge accumulates enough to activate the diode circuit 510 and/or 520, the ESD protection circuit 500 can instantly conduct the ESD charge on the critical path to the power rail. Therefore, the ESD protection circuit 500 can effectively clamp the ESD voltage on the critical path to prevent the ESD voltage from damaging the electronic components of the internal circuit.

Although the disclosure has been disclosed above in the embodiments, the embodiments are not intended to limit the disclosure. Persons with ordinary knowledge in the technical field may make some changes and modifications without departing from the spirit and scope of the disclosure. Therefore, the protection scope of the disclosure shall be determined by the appended claims.

What is claimed is:
1. An integrated circuit, comprising:
a first power rail;
a connecting pad;
a first internal circuit coupled to the connecting pad through a first signal wire;
a second internal circuit coupled to the first internal circuit through a second signal wire; and
a first electrostatic discharge (ESD) protection circuit coupled between the second signal wire and the first power rail, wherein in response to charged-device model ESD occurring in the integrated circuit, the first ESD protection circuit conducts ESD charge on the second signal wire to the first power rail.
2. The integrated circuit as claimed in claim 1, wherein the first power rail is configured to transmit a power voltage or a reference voltage.
3. The integrated circuit as claimed in claim 1, further comprising:
a second ESD protection circuit coupled between the second signal wire and a second power rail, wherein
the first power rail is configured to transmit one of a power voltage and a reference voltage, and the second power rail is configured to transmit the other of the power voltage and the reference voltage; and
in response to the charged-device model ESD occurring in the integrated circuit, the second ESD protection circuit conducts the ESD charge on the second signal wire to the second power rail.
4. The integrated circuit as claimed in claim 1, wherein the connecting pad is arranged in a connecting pad layout area of the integrated circuit, and the first internal circuit, the second internal circuit, the second signal wire, and the first ESD protection circuit are arranged in an internal circuit layout area of the integrated circuit.
5. The integrated circuit as claimed in claim 4, further comprising:
a second ESD protection circuit arranged in the connecting pad layout area, wherein the second ESD protection circuit is coupled to the connecting pad,
the first power rail is configured to transmit one of a power voltage and a reference voltage, and a second power rail of the integrated circuit is configured to transmit the other of the power voltage and the reference voltage, and
in response to an ESD event occurring in the connecting pad, the second ESD protection circuit conducts ESD charge on the connecting pad to at least one of the first power rail and the second power rail.
6. The integrated circuit as claimed in claim 5, wherein the second ESD protection circuit comprises:
a first diode coupled between the connecting pad and the first power rail; and
a second diode coupled between the connecting pad and the second power rail.
7. The integrated circuit as claimed in claim 5, wherein the second ESD protection circuit comprises:
an ESD clamping circuit coupled between the first power rail and the second power rail.
8. The integrated circuit as claimed in claim 1, wherein the first ESD protection circuit comprises:
a first diode circuit, wherein a cathode of the first diode circuit is coupled to the second signal wire, and an anode of the first diode circuit is coupled to the first power rail; and
a second diode circuit, wherein an anode of the second diode circuit is coupled to the second signal wire, and a cathode of the second diode circuit is coupled to the first power rail.
9. The integrated circuit as claimed in claim 8, wherein the first diode circuit comprises:
a diode, wherein a cathode of the diode is coupled to the cathode of the first diode circuit; and
a transistor, wherein a first end and a control end of the transistor are coupled to an anode of the diode, and a second end of the transistor is coupled to the anode of the first diode circuit.

10. The integrated circuit as claimed in claim 8, wherein the second diode circuit comprises:
- a diode, wherein an anode of the diode is coupled to the anode of the second diode circuit; and
- a transistor, wherein a first end and a control end of the transistor are coupled to a cathode of the diode, and a second end of the transistor is coupled to the cathode of the second diode circuit.

\* \* \* \* \*